No. 833,692. PATENTED OCT. 16, 1906.
O. NEFF.
CASTRATING BOX.
APPLICATION FILED MAR. 2, 1906.

2 SHEETS—SHEET 1.

Witnesses:
S. S. Burket
J. W. Mister

Inventor:
Orvil Neff,
By
Attorneys

No. 833,692. PATENTED OCT. 16, 1906.
O. NEFF.
CASTRATING BOX.
APPLICATION FILED MAR. 2, 1906.
2 SHEETS—SHEET 2.
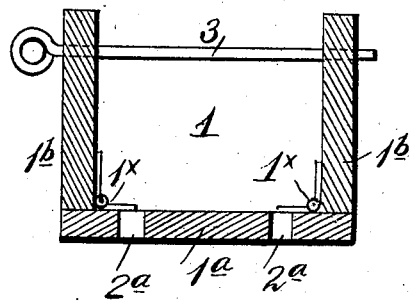
Fig. 3.
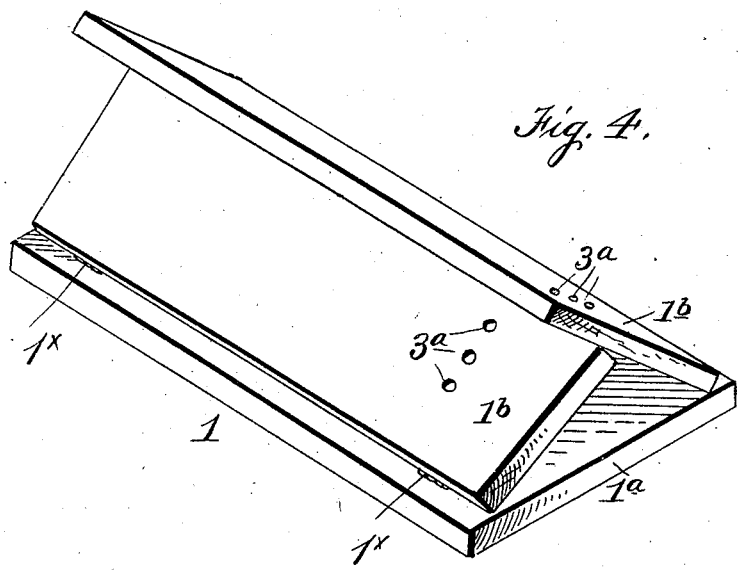
Fig. 4.
WITNESSES:
S. S. Burket.
J. W. Mister
INVENTOR:
Orvil Neff,
Attorneys

UNITED STATES PATENT OFFICE.

ORVIL NEFF, OF ELKHART COUNTY, NEAR MILFORD, INDIANA.

CASTRATING-BOX.

No. 833,692.　　　Specification of Letters Patent.　　　Patented Oct. 16, 1906.

Application filed March 2, 1906. Serial No. 303,928.

*To all whom it may concern:*

Be it known that I, ORVIL NEFF, a citizen of the United States, residing in the county of Elkhart, near the town of Milford, in the county of Kosciusko and State of Indiana, have invented certain new and useful Improvements in Castrating-Boxes, of which the following is a specification.

My invention pertains to improvements in contrivances for castrating or emasculating purposes. Its object is to provide for readily and conveniently performing the operation involved in the foregoing; also, to effect the same with facility and the minimum difficulty and without requiring additional personal assistance or help for that purpose; also, to carry out these ends in a simple, economic, and effective manner.

Said invention consists of certain structural features substantially as hereinafter fully disclosed, and specifically pointed out by the claim.

Figure 1:
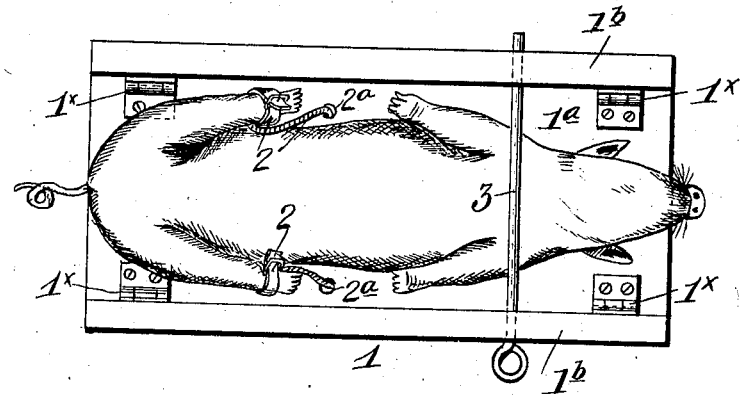
Figure 2:
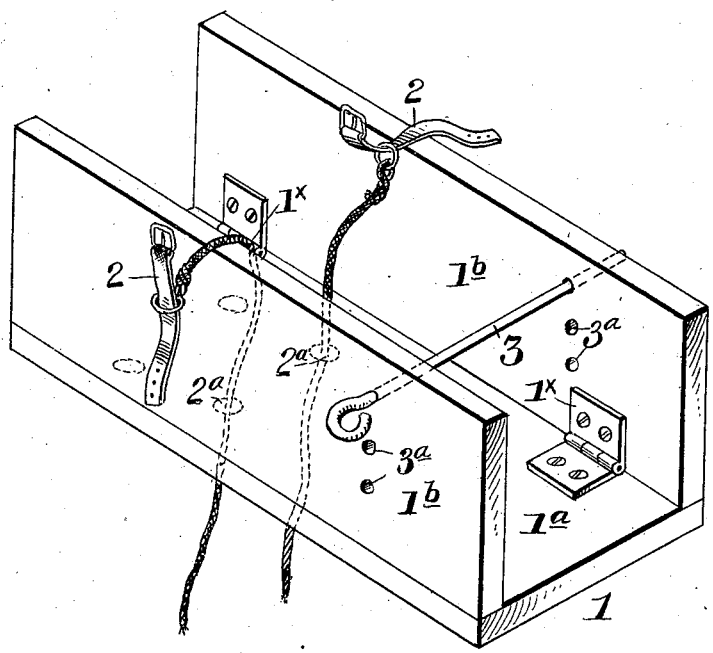

In the accompanying drawings, illustrating the preferred embodiment of my invention, Figure 1 is a plan view showing the contrivance as applied for practical use. Fig. 2 is a perspective view of the device when not in operation. Fig. 3 is a cross-section of the same, produced through alining apertures thereof for the reception of the binding or fettering rope or strap and viewing the retaining rod or "crowbar" for aiding the confining of the animal. Fig. 4 is a view showing the contrivance in its "knockdown" or folded form for convenience of transportation or shipment.

In carrying out my invention I suitably construct a receptacle 1, which, however, has only a bottom member $1^a$ and lateral members $1^b$, preferably of boards, the latter being hinged at their bottom edges, as at $1^\times$, to said bottom member to normally stand within the plane thereof, thus being restricted from folding outward, but permitted to fold inward and lie flat one upon the other when the device is out of use or for convenience in carrying the same under the arm, for instance.

The receptacle 1 is provided with ropes or buckle-equipped straps 2 and a rod or crowbar 3 for effectiveness in aiding the castrating or emasculating operation, as will be readily appreciated. The ropes or straps 2 are passed through selected opposite openings of a series $2^a$ of such, produced through the bottom member of the receptacle, according to the size of the animal being operated upon. The rod or crowbar 3 is inserted or passed transversely through coincident or registering openings of a series $3^a$, formed in the lateral members $1^b$, higher or lower, as circumstances called for, as will be apparent.

Preliminary to the castrating operation the animal—a sheep, hog, or of the larger class—is disposed upon its back within the receptacle, the lateral members or boards being elevated into their normal position, thus completely bringing the animal under control, as against struggling to free itself. The rod or crowbar 3 is inserted, as noted, so as to restrain the animal lifting its head, while the ropes or straps 2 are suitably looped or secured at their upper ends around its hind legs, as indicated, and drawn upon from below the bottom member, bringing the legs down upon the animal's body, and then suitably tied together for the retention of the same in place. The castrating or emasculating process is now proceeded with in the usual manner, as well understood. Thus it is apparent that with this device the owner is enabled to conduct the entire aforesaid operation without any additional personal aid and that the same may be quickly and effectively performed, while said device thus employed is exceedingly simple, cheap, and readily operated.

I claim—

A castrating or emasculating device comprising lateral board members and a bottom board member having opposite holes or openings therein, near one end, binding-ropes or means insertible through said openings or holes and adapted to be connected together from the outside of said bottom member and equipped with straps for fastening around the rear legs of the animal under operation, and a rod insertible through holes or openings in said lateral board members at the opposite end of the device for pillowing the animal therein.

In testimony whereof I have signed my name to this specification in the presence of two subscribing witnesses.

ORVIL NEFF.

Witnesses:
　RICHARD VANDERVEER,
　J. E. PETTED.